United States Patent [19]

Carubia et al.

[11] 4,095,266

[45] June 13, 1978

[54] DATA-PROCESSING SYSTEM WITH A SET OF PERIPHERAL UNITS REPETITIVELY SCANNED BY A COMMON CONTROL UNIT

[75] Inventors: Giovanni Carubia, Mariano Comense; Roberto Papa; Cesare Pratelli, both of Milan, all of Italy

[73] Assignee: Societa Italiana Telecomunicazioni Siemens S.p.A., Milan, Italy

[21] Appl. No.: 737,269

[22] Filed: Nov. 1, 1976

[30] Foreign Application Priority Data

Oct. 30, 1975 Italy .............................. 28867 A/75

[51] Int. Cl.² .............................................. G06F 9/16
[52] U.S. Cl. .................................................... 364/200
[58] Field of Search ........................ 364/200 MS File

[56] References Cited

U.S. PATENT DOCUMENTS

| 3,518,632 | 6/1970 | Threadgold et al. | 364/200 |
| 3,656,123 | 4/1972 | Carnevale et al. | 364/200 |
| 3,997,896 | 12/1976 | Cassarino, Jr. et al. | 364/200 |

*Primary Examiner*—Raulfe B. Zache
*Attorney, Agent, or Firm*—Karl F. Ross

[57] ABSTRACT

A multiplicity of peripheral units are consecutively scanned, in respective phases of a recurrent operating cycle, by a central unit including a processor for incoming and outgoing data. The processor is connected to a programmer emitting a series of binary instructions during each phase, the instructions being stored in a read-only memory from which they are read out during respective subphases of each phase under the control of an address counter, the last instruction of a series carrying a characteristic bit which advances a phase counter and causes a switch of the central unit to a different peripheral unit. At the beginning of each new phase, the address counter receives an initial count from a random-access memory addressed by the phase counter, this initial count representing the address of the first instruction of the series to be executed in that phase; the initial count is entered in a corresponding stage of the random-access memory, in response to the characteristic phase-changing bit, for subsequent readout in a homologous phase of the next operating cycle. The address counter includes an incrementer progressively increasing its count at the end of each subphase; upon the appearance of a special instruction in the output of the read-only memory, initiating a microprogram including one or more ancillary instructions, the reading of the address counter identifying that special instruction is stored in a buffer register and, after incrementation, is fed back to the address counter to restart its count with the address immediately following the one of the special instruction. In response to a malfunction within the system, the processor loads the phase counter with the address of an extracurricular phase used for testing operations and not assigned to any peripheral unit.

8 Claims, 4 Drawing Figures

DATA-PROCESSING SYSTEM WITH A SET OF PERIPHERAL UNITS REPETITIVELY SCANNED BY A COMMON CONTROL UNIT

FIELD OF THE INVENTION

Our present invention relates to a data-processing system, e.g. for telecommunication, wherein a multiplicity of peripheral units are consecutively scanned by a central unit in respective phases of a recurrent operating cycle.

BACKGROUND OF THE INVENTION

In such a system, the central unit includes a processor which handles incoming and outgoing data to be written in or read out from an associated data store, e.g. as described in U.S. Pat. No. 3,533,082. The processor receives instructions from a programmer in respective subphases of any phase, these instructions forming part of what may be termed a macroprogram individual to each peripheral unit. Certain instructions within any macroprogram may call for the execution of a predetermined sequence of ancillary instructions, such sequence constituting a subroutine or microprogram. Thus, for example, a macroinstruction "read data store" may initiate a sequence of microinstructions for extracting an address code from a memory, feeding that code to an address input of the data store, activating this store to read out the data word identified by that address, and loading the data word into a register.

In conventional systems operating in the time-division mode (TDM), the number of subphases — established by a train of clock pulses from a time base — is the same for all the phases and is so chosen as to allow the maximum number of possible steps of a macroprogram to be carried out during the time when the central unit dialogues with a peripheral unit in its assigned phase. Since in most instances the number of program steps actually carried out during a phase will fall short of this maximum, the average time utilized for executing instructions will be only a fraction of the duration of a phase. Thus, the processor will be idle during a substantial portion of a scanning cycle.

Situations arise, furthermore, in which additional time is required for communication with a particular unit, as when a routinely performed parity check reveals an error and tests are required to determine its source.

OBJECTS OF THE INVENTION

An important object of our present invention, accordingly, is to devise means in such a system for varying the length of a phase, i.e. the number of its subphases, in accordance with the particular macroprogram or portion thereof to be carried out in that phase, thus eliminating the idle processor time of conventional systems.

Another object is to facilitate a switch to an extracurricular phase, not assigned to any peripheral unit, in the event that a special program such as a series of testing operations is to be carried out.

SUMMARY OF THE INVENTION

In accordance with our present invention, the programmer controlling the processor of the central unit comprises a read-only memory serving as storage means for instructions to be read out, the locations of these instructions in that memory being identified by an address counter during consecutive subphases of each phase. The last instruction of a macroprogram (or part thereof) to be performed during a given phase carries a characteristic portion, generally a single bit, whose presence steps a phase counter controlling another memory for the purpose of introducing an initial count into the address counter at the beginning of each new phase. This initial count, identifying the section of the read-only memory in which the macroprogram for the new phase is stored as well as the first cell of that section to be read in the current phase, is progressively increased during successive subphases with the aid of stepping means including the aforementioned time base.

Advantageously, according to another feature of our invention, the address counter comprises an address register and an arithmetic element connected in a loop with that register for incrementing its count at the end of each subphase. This incrementer also intervenes in the execution of a microprogram initiated by a special instruction whose address is stored in a buffer register provided for that purpose; at the end of the microprogram during which the address counter has advanced according to the number of subphases involved, the address of the special macroinstruction is fed back to the address register through the incrementer so as to identify the next macroinstruction in the read-only memory.

Pursuant to a further feature of our invention, a numerical value constituting the aforementioned initial count is written in a corresponding stage of the address memory at the end of each phase in response to the characteristic portion of the final instruction. In accordance with still another advantageous feature of our invention, this numerical value is taken directly from the read-only memory which works into the processor by way of delay means such as an instruction register introducing a lag of one subphase between the readout of an instruction from that memory and the feeding of the instruction to the processor. The macroinstruction last read out, therefore, is not executed in the current phase so that its address can serve as the starting address for the homologous phase forming part of the next scanning cycle.

According to yet a further feature of our invention, the address memory controlled by the phase counter has one or more additional stages which are not assigned to any peripheral unit, each of these additional stages containing the address of an extracurricular series of instructions to be carried out in response to a signal fed to a switching input of the phase counter. For this purpose, the address memory should be of the random-access type so as to be able to shift to that additional stage from any part of a scanning cycle whenever the switching signal appears or, more exactly, upon completion of the phase in progress at the time of such appearance. The switching signal may be an address code generated by the processor in response to an alarm condition arising from the discovery of an error as discussed above.

BRIEF DESCRIPTION OF THE DRAWING

The above and other features of our invention will now be described in detail with reference to the accompanying drawing in which.

SPECIFIC DESCRIPTION

Figure 1:
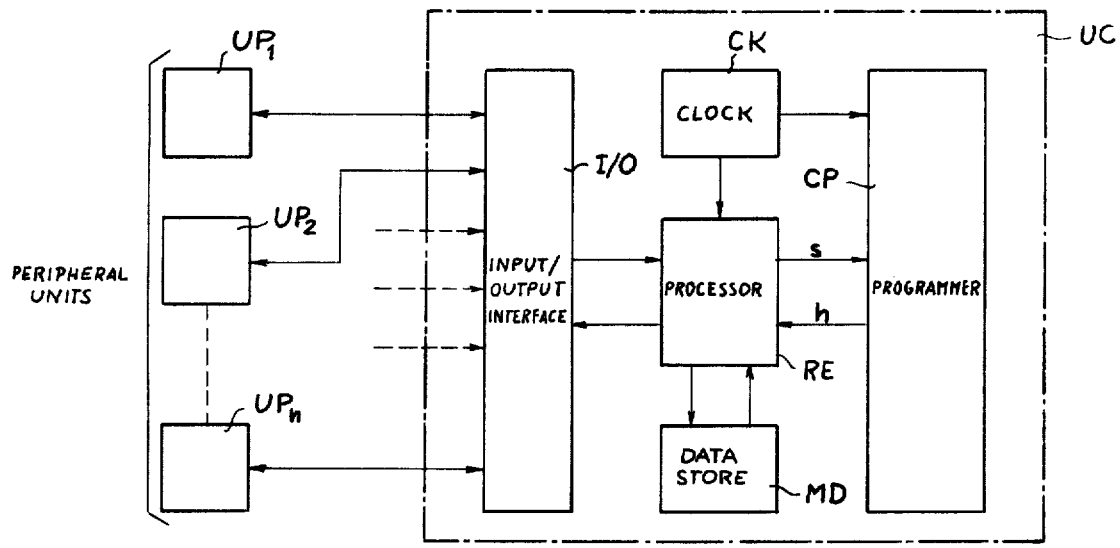
FIG. 1 is a block diagram of a data-processor system to which our invention is applicable.

In FIG. 1 we have represented a set of peripheral units $UP_1$, $UP_2$, ... $UP_n$ associated with a common central unit UC periodically communicating with each unit during a respective phase of a recurrent scanning cycle, the phases as well as the cycle being of variable length. Central unit UC comprises an input/output interface I/O exchanging binary signal with a processor RE which is in two-way communication with a data store MD. A programmer CP, more fully described hereinafter, feeds instructions to processor RE via a conductor multiple $h$ and can receive an alarm signal in the form of a special code from the processor via another multiple $s$.

The components of unit UC are controlled by a clock CK serving as a time base.

Figure 2:
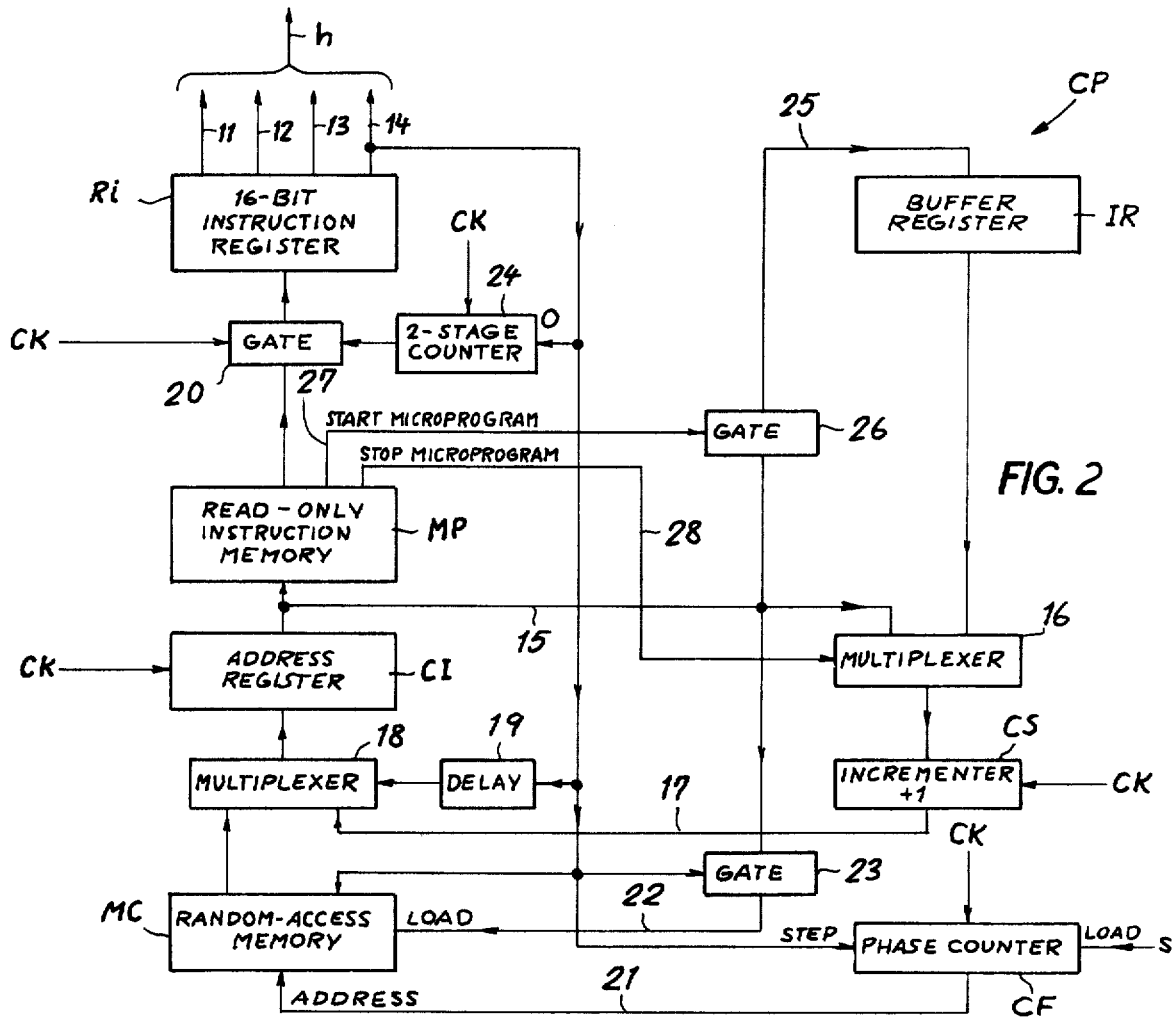
FIG. 2 is a more detailed diagram of a programmer included in a central unit forming part of the system of FIG. 1.

Reference will now be made to FIG. 2 showing details of the programmer CP. The principal constituents of the programmer are a read-only instruction memory MP, a random-access address memory MC, a phase counter CF, an address counter including a register CI and an incrementer CS, a buffer register IR, and a 16-bit instruction register RI. Register RI has several groups of output leads assembled in multiple $h$, i.e. a group of eight leads 11 carrying 8-bit data addresses, a group of five leads 12 carrying 5-bit operational codes, and a pair of leads 13 carrying parity bits for checking the address and operational codes. There is also a single output lead 14 representing a characteristic bit position, this lead being energized to command a phase change whenever the last instruction to be carried out in the current phase appears in the output of register RI.

Memory MP is divided into a multiplicity of sections each having a number of cells which store the instructions constituting a macroprogram involving one of the several peripheral units $UP_1$ - $UP_n$ (FIG. 1), there being one section for each unit. At least one of the sections of this memory contains instructions for an error-testing program. Parts of memory MP are set aside for sequences of ancillary instructions constituting microprograms to which access can be had upon the addressing of certain macroinstructions.

Address register CI and incrementer CS form an address counter delivering to memory MP a numerical code consisting of two parts, the first part identifying the section of that memory to be read in a particular phase whereas the other second part addresses a specific cell in that section. It is this second part whose numerical value is increased by 1, i.e. by a unity step, at the end of each subphase as the contents of register CI are read out by a trailing edge of a clock pulse CK via a multiple 15 and a multiplexer 16 to incrementer CS. The increased count is fed back to register CI on the leading edge of the next clock pulse by way of a multiple 17 and a multiplexer 18 controlled from lead 14 through a delay network 19. Concurrently therewith, i.e. on the leading edge of the clock pulse following the one which discharged the register CI, a gate 20 is opened to let an instruction from memory MP pass into register RI and thence via multiple $h$ to processor RI (FIG. 1). If that instruction happens to be a final one, indicating the end of a phase, the energization of lead 14 steps the phase counter CF whose count is fed with the next clock pulse CK to an address input of memory MC by way of a multiple 21.

Output multiple 15 of register CI has a branch 22 extending through a gate 23 to a loading input of memory MC whereby the last instruction address present in the output of register CI is stored in the stage of memory MC associated with the phase just being concluded. Thus, when counter CF again addresses the same stage in the homologous phase of the next scanning cycle, the address of this last instruction is present in that stage as an initial count setting the register CI. That last instruction has not been executed before inasmuch as the path from memory MP to register RI is blocked for two clock cycles with the aid of an ancillary counter 24 set to zero by the bit on lead 14, the output of this counter controlling the gate 20.

If the macroinstruction addressed by a code in the output of register CI calls for the initiation of a microprogram, that macroinstruction itself is not read out but switches some of the leads of output multiple 15 of register CI to that part of memory MP in which the requested microprogram is stored whereby its several microinstructions are transmitted to register RI during the following subphases. The address of this macroinstruction is delivered to buffer register IR via a branch 25 of multiple 15 including a gate 26 controlled by a lead 27 which is energized upon the occurrence of the macroinstruction starting the microprogram. Multiplexer 16 is switched at the end of the microprogram, upon the energization of a lead 28 by the last microinstruction thereof, to pass the contents of buffer register IR into arithmetic element CS for incrementation and delivery to address register CI by way of multiplexer 18 in the normal position of the latter.

Figure 4:
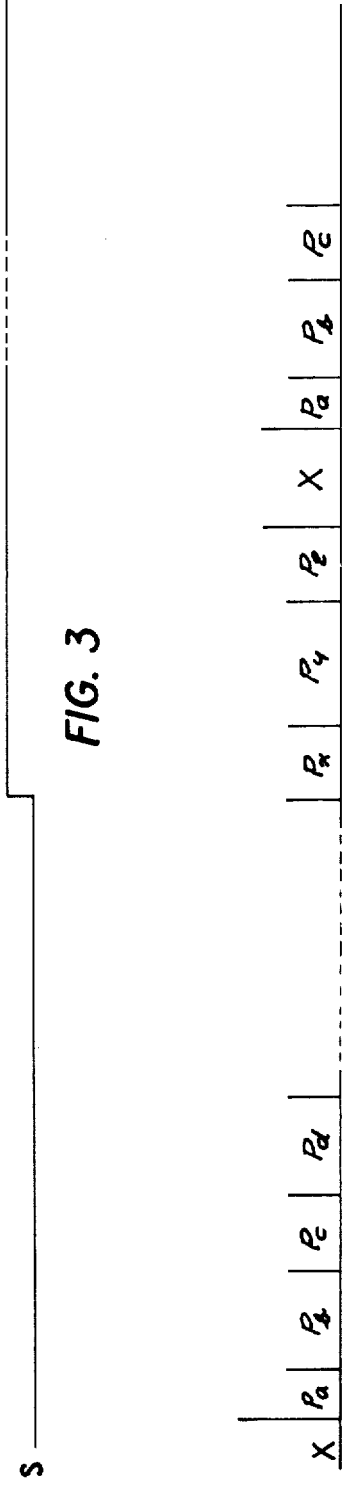
FIG. 4 is a timing diagram representing a scanning cycle of the central unit.

If an alarm condition detected by processor RE loads the phase counter CF with an extracurricular address code transmitted to it via multiple $s$, that code supersedes its current count and is therefore fed into memory MC via multiple 21 upon the next energization of lead 14. This address code identifies in memory MC the location of the first instruction of a test program to be performed in an unassigned phase X, FIG. 4, which is loaded into register CI in the aforedescribed manner and results in the sequential readout of the instructions of that program from memory MP in the way described above for the instructions of regular phases. When the last instruction of this special program brings about a phase change, the programmer CP is switched to the phase immediately following which according to FIG. 4 is the first phase $P_a$ of a series of assigned phases $P_a$, $P_b$ ... $P_y$, $P_z$ forming part of a scanning cycle. Upon a switchover to phase X, central unit UC remains connected to the peripheral unit engaged by it in the immediately preceding phase; otherwise, a phase change is accompanied by switchover of the central unit from one peripheral unit to the next, via conventional circuitry including unit I/O.

The construction of phase counter CF may be similar to that of the address counter consisting of register CI and incrementer CS, with the last regular phase count preceding the alarm code stored in a buffer register analogous to register IR associated with the address counter. In this way the normal phase sequence may resume after the unassigned phase X has terminated.

Figure 3:
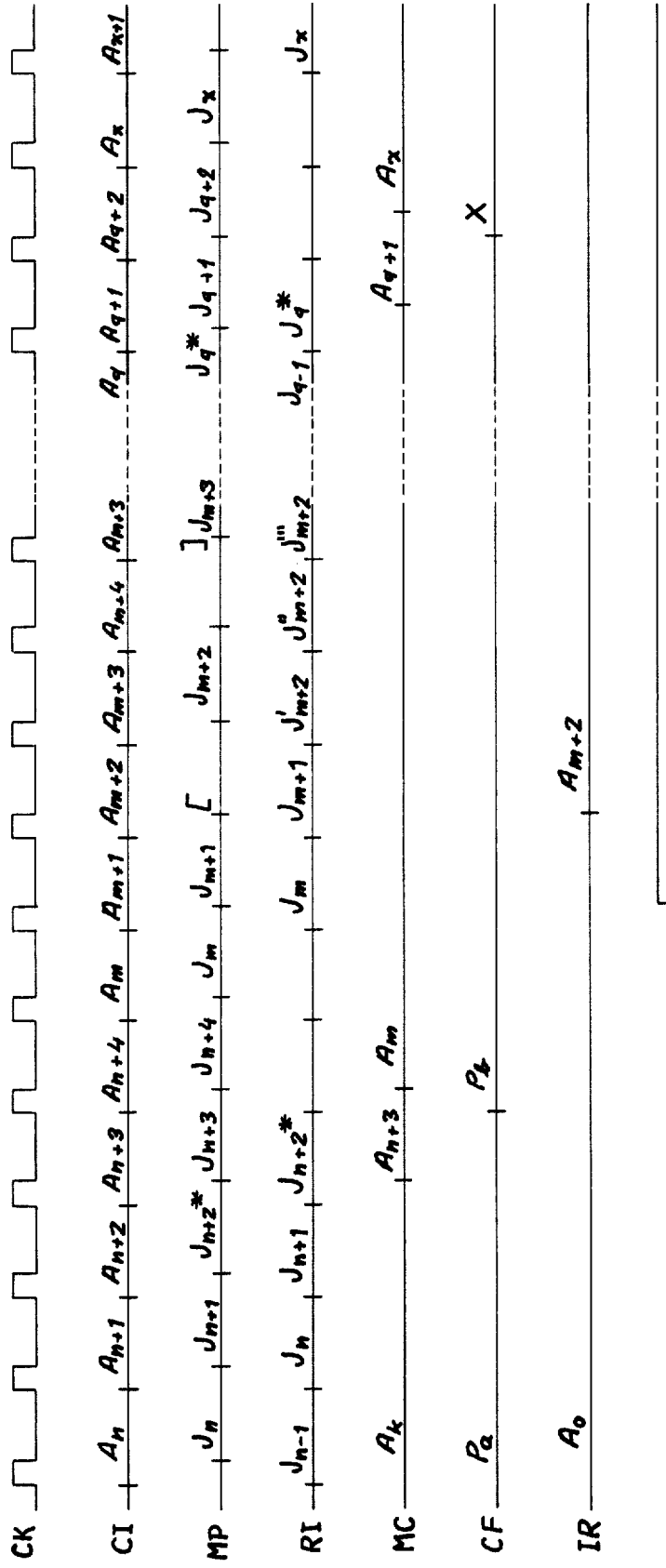
FIG. 3 is a set of timing diagrams relating to the operation of the programmer shown in FIG. 2.

We shall now refer to FIG. 3 for a more detailed discussion of the operation of the programmer CP.

The top row in FIG. 3 represents a train of clock pulses CK spanning a succession of scanning cycles illustrated in FIG. 4. The other diagrams show various binary codes present at various times in register CI, in memory MP, in register RI, in memory MC, in counter CF, in register IR and on the output multiple s of processor RE.

On the first clock pulse CK shown in FIG. 3, register CI is assumed to carry the address $A_n$ of a cell in a section of memory MP containing an instruction $J_n$ which is part of a macroprogram involving a peripheral unit (e.g. $UP_1$ in FIG. 1) engaged by central unit UC during the phase in progress, this being the phase $P_a$ as indicated in the diagram relating to counter CF. At this time the address register RI contains an immediately preceding instruction $J_{n-1}$; the stage of memory MC allocated to the currently engaged peripheral unit contains a code $A_k$ used at the beginning of the phase to identify the first one of a series of cells in the active section of memory MP to be read in this phase. Buffer register $A_o$, unless previously cleared, may still contain an address $A_o$ left over from an earlier microprogram.

On the trailing edge of that first clock pulse, instruction $J_n$ appears in the output of memory MP. On the leading edge of the second clock pulse, address $A_n$ fed also to incrementer CS is returned to register CI as the next address $A_{n+1}$ even as register RI receives the instruction $J_n$ from memory MP. In like manner, address $A_{n+2}$, instruction $J_{n+2}$ and instruction $J_{n+1}$ appear in the outputs of register CI, memory MP and register RI during the next subphase.

Instruction $J_{n+2}$, as indicated by an asterisk (*), is the final instruction for the current phase and therefore carries an extra bit energizing the lead 14 upon its emergence from register RI. This opens the gate 23 so that the count $A_{n+3}$ now present on output multiple 15 of register CI is loaded into memory MC as a writing input of that memory is concurrently energized. High voltage on the stepping input of pulse counter CF increases its count on the leading edge of the next clock pulse CK to address a stage of memory MC allocated to the next phase $P_b$ in which another peripheral unit, e.g. $UP_2$, exchanged information with central unit UC. The address $A_m$ of the corresponding section of memory MP and of the first cell of that section to be read in the new phase is then read into register CI, as a starting count, by a shifting of multiplexer 18 under the control of the bit on lead 14 suitably delayed in network 19. That bit also interrupts the transmission of instructions from memory MP to register RI by blocking the gate 20 for two subphases with the aid of two-stage counter 24.

An address $A_{n+4}$ and an instruction $J_{n+4}$, reached by register CI and memory MP just before the readout of the new address $A_m$ from memory MC, remain ineffectual. As the counter CI, CS advances to the next address $A_{m+1}$, the first instruction $J_m$ of phase $P_b$ is fed from memory MP to register RI in the manner described above. In the following subphase the register RI receives the instruction $J_{m+1}$ while the register CI already contains the address $A_{m+2}$ of the following instruction $J_{m+2}$.

It will be assumed that this following instruction is designed to initiate a microprogram, as indicated by bracketing $[J_{m+2}]$. With lead 27 now energized, gate 26 is opened to let the address $A_{m+2}$ of this invention enter the buffer register IR in the same subphase in which the register RI still carries the preceding instruction $J_{m+1}$. As a result of internal switching operations in memory MP, a first microinstruction $J'_{m+2}$ (which may or may not be identical with instruction $J_{m+2}$) appears in register RI in the next subphase in which the count of address register CI reads $A_{m+2}$. On the following clock pulse CK, the address register reaches a count $A_{m+4}$ while the second microinstruction $J''_{m+2}$ is read into register RI.

If the third microinstruction $J'''_{m+2}$ is the last one of the subroutine, as here assumed, the appearance of that microinstruction in the output of memory MP energizes the lead 28 to shift the multiplexer 16 whereby buffer register IR discharges its stored count $A_{m+2}$ into incrementer CS. Thus, register CI reverts to count $A_{m+3}$ in the subphase in which microinstruction $J'''_{m+2}$ is read into register RI. In this subphase, accordingly, the next macroinstruction $J_{m+3}$ is called forth from memory MP; instruction $J_{m+3}$ could, of course, also be the initiator of a microprogram of its own.

In phase $P_b$ the final instruction, identified by an address $A_q$, has been designated $J_q^*$ and, in the aforedescribed manner, loads the corresponding stage of memory MC with the address $A_{q+1}$ of the next-following instruction then present on output multiple 15 of register CI. If, instead, the phase were to end with the microinstruction $J'''_{m+2}$, the address written in that stage would be the count $A_{m+3}$. In either case, therefore, the address count would resume with an instruction not yet executed when the phase $P_b$ recurs in the next scanning cycle.

In FIG. 3 the alarm signal s is shown to come into existence at some point during phase $P_b$. Thus, the phase change brought about by the energization of lead 14 with the characteristic bit of instruction $J_q^*$ results in a switch to unassigned phase X in the subphase in which register CI carries the address $A_{q+2}$ and the corresponding instruction $J_{q+2}$ appears in the output of memory MP. The first instruction $J_x$ of the extracurricular test program has an address $A_x$, read out from the corresponding stage of memory CF, and is transferred to register RI in the following subcycle as counter CI, CS advances to address $A_{x+1}$. The test program thus evolves analogously to the regular programs described above, it final instruction again carrying the extra bit on lead 14 for a changeover to the next regular phase $P_c$.

We claim:

1. In a data-processing system wherein a central unit successively communicates with a multiplicity of associated peripheral units in respective phases of a recurrent scanning cycle individually assigned to said peripheral units, said central unit including a processor and a programmer delivering to said processor a series of instructions for the exchange of data with any peripheral unit during respective subphases of a phase assigned thereto, the improvement wherein said programmer comprises:

storage means containing instructions to be read out to said processor;

address-counting means connected to said storage means for identifying the locations of instructions to be read out during consecutive subphases of each phase of a scanning cycle, certain of said instructions carrying a characteristic portion commanding a phase change;

phase-counting means connected to said storage means for stepping in response to said characteristic portion of an instruction read out therefrom;

memory means controlled by said phase-counting means for introducing an initial count into said address-counting means at the beginning of each new phase to identify the location of the first of a series of instructions to be fed to said processor during said new phase; and stepping means for progressively increasing the count of said address-counting means during successive subphases of each phase.

2. The improvement defined in claim 1 wherein said address-counting means comprises an address register and arithmetic means connected in a loop with said address register for incrementing the count thereof at the end of each subphase.

3. The improvement defined in claim 2 wherein said instructions include a special instruction initiating a microprogram which extends over several subphases, further comprising a buffer register and circuit means for inserting said buffer register in said loop between said address register and said arithmetic means, in the presence of a count in said address register identifying the location of said special instruction, for preserving the last-mentioned count throughout the subphases of said microprogram and feeding back the preserved count via said arithmetic means to said address register to identify the location of an instruction immediately following said special instruction.

4. The improvement defined in claim 1 wherein said memory means has stages respectively allotted to said peripheral units, said stages being sequentially addressable by codes generated by said phase-counting means in respective phases, said memory means having input connections extending from said address-counting means for entering in each of said stages at the end of a corresponding phase of each cycle, in response to said characteristic portion, a numerical value constituting said initial count.

5. The improvement defined in claim 4 wherein said programmer further comprises delay means inserted between said storage means and said processor introducing a lag of one subphase between the readout of an instruction from said storage means and the feeding of the instruction to the processor whereby the initial count stored in a stage of said memory means at the end of a phase identifies a location adjoining that of the instruction last read out in the phase just concluded.

6. The improvement defined in claim 5 wherein said delay means comprises an instruction register with a multiplicity of output leads for respective bits of an instruction read out from said storage means, one of said bits constituting said characteristic portion.

7. The improvement defined in claim 4 wherein said memory means is provided with at least one additional stage, not allotted to any of said peripheral units, containing the address of the first instruction of an extracurricular series of instructions in said storage means, said phase-counting means being provided with a switching input for addressing said additional stage to read out the contents thereof to said address-counting means in an unassigned phase of a cycle.

8. The improvement defined in claim 7 wherein said processor is provided with an alarm lead connected to said switching input for addressing said additional stage in response to an alarm condition ascertained by said central unit.

* * * * *